US012614347B2

(12) United States Patent　　(10) Patent No.:　US 12,614,347 B2
Oya　　(45) Date of Patent:　Apr. 28, 2026

(54) INFORMATION PROCESSING DEVICE, INFORMATION PROCESSING METHOD, AND PROGRAM

(71) Applicant: Sony Group Corporation, Tokyo (JP)

(72) Inventor: Ruri Oya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 166 days.

(21) Appl. No.: 18/292,571

(22) PCT Filed: Feb. 18, 2022

(86) PCT No.: PCT/JP2022/006585
　§ 371 (c)(1),
　(2) Date: Jan. 26, 2024

(87) PCT Pub. No.: WO2023/013115
　PCT Pub. Date: Feb. 9, 2023

(65) Prior Publication Data
　US 2025/0086888 A1　Mar. 13, 2025

(30) Foreign Application Priority Data

Aug. 4, 2021　(JP) ................................. 2021-128256

(51) Int. Cl.
　*G06T 17/00*　(2006.01)
(52) U.S. Cl.
　CPC .................................... *G06T 17/00* (2013.01)

(58) Field of Classification Search
　CPC . G06T 17/00; G06T 19/006; G06T 2219/024; G06T 19/20; G06T 15/00; G06T 13/40; G06F 21/64; G06F 3/011
　See application file for complete search history.

(56) References Cited

U.S. PATENT DOCUMENTS

2021/0279695 A1* 9/2021 Rice ........................ G06Q 20/12
2021/0325974 A1* 10/2021 Boissière ................. G06F 3/03

FOREIGN PATENT DOCUMENTS

| JP | 2002-279051 A | 9/2002 |
|---|---|---|
| JP | 2003-030318 A | 1/2003 |
| JP | 2008-234341 A | 10/2008 |
| JP | 2008-253521 A | 10/2008 |
| JP | 2012-248021 A | 12/2012 |

(Continued)

OTHER PUBLICATIONS

Nakagawa, Delegation of Digital Heritage to Personal AI Agents, IPSJ SIG Technical Report, 2020, pp. 1-7.

*Primary Examiner* — Hau H Nguyen
(74) *Attorney, Agent, or Firm* — Paratus Law Group, PLLC

(57) ABSTRACT

There is provided an information processing device, an information processing method, and a program capable of appropriately performing processing of a virtual object. The information processing device includes a control unit that performs control for determining a processing method for each of one or more virtual objects owned by a user, according to presence or absence of information that is set for the each of the one or more virtual objects and that stipulates a processing method for a corresponding one of the one or more virtual objects when a processing trigger for starting processing of a virtual object is acquired.

15 Claims, 3 Drawing Sheets

(56)  References Cited

FOREIGN PATENT DOCUMENTS

| JP | 2013-131131 A | 7/2013 |
| JP | 2016-045604 A | 4/2016 |
| JP | 2019-204194 A | 11/2019 |

* cited by examiner

20 : MANAGEMENT SERVER

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2022/006585 (filed on Feb. 18, 2022) under 35 U.S.C. § 371, which claims priority to Japanese Patent Application No. 2021-128256 (filed on Aug. 4, 2021), which are all hereby incorporated by reference in their entirety.

TECHNICAL FIELD

The present disclosure relates to an information processing device, an information processing method, and a program.

BACKGROUND ART

In recent years, management of transfer, post-mortem inheritance and the like of not only tangible objects but also moving image data, still image data, audio data, and other electronic data are required, similarly to assets.

For example, Patent Document 1 below describes that, as a right holder of a digital asset dies, processing of inheritance and transfer is performed according to a method registered in advance.

CITATION LIST

Patent Document

Patent Document 1: Japanese Patent Application Laid-Open No. 2008-234341

SUMMARY OF THE INVENTION

Problems to be Solved by the Invention

Here, in recent years, use of a virtual space, which is a virtual world connected via the Internet, has become widespread, and each user owns various virtual objects in the virtual world. However, there are cases where the virtual objects are left unattended and wasted due to various factors such as the owner's death or disappearance, and no login to the virtual space for a long period of time.

Accordingly, the present disclosure proposes an information processing device, an information processing method, and a program capable of appropriately performing processing of a virtual object.

Solutions to Problems

According to the present disclosure, there is proposed an information processing device including a control unit that performs control for determining a processing method for each of one or more virtual objects owned by a user, according to presence or absence of information that is set for the each of the one or more virtual objects and that stipulates a processing method for a corresponding one of the one or more virtual objects when a processing trigger for starting processing of a virtual object is acquired.

According to the present disclosure, there is proposed an information processing method including, by a processor, performing control for determining a processing method for each of one or more virtual objects owned by a user, according to presence or absence of information that is set for the each of the one or more virtual objects and that stipulates a processing method for a corresponding one of the one or more virtual objects when a processing trigger for starting processing of a virtual object is acquired.

According to the present disclosure, there is proposed a program for causing a computer to function as a control unit that performs control for determining a processing method for each of one or more virtual objects owned by a user, according to presence or absence of information that is set for the each of the one or more virtual objects and that stipulates a processing method for a corresponding one of the one or more virtual objects when a processing trigger for starting processing of a virtual object is acquired.

MODE FOR CARRYING OUT THE INVENTION

Figure 1:
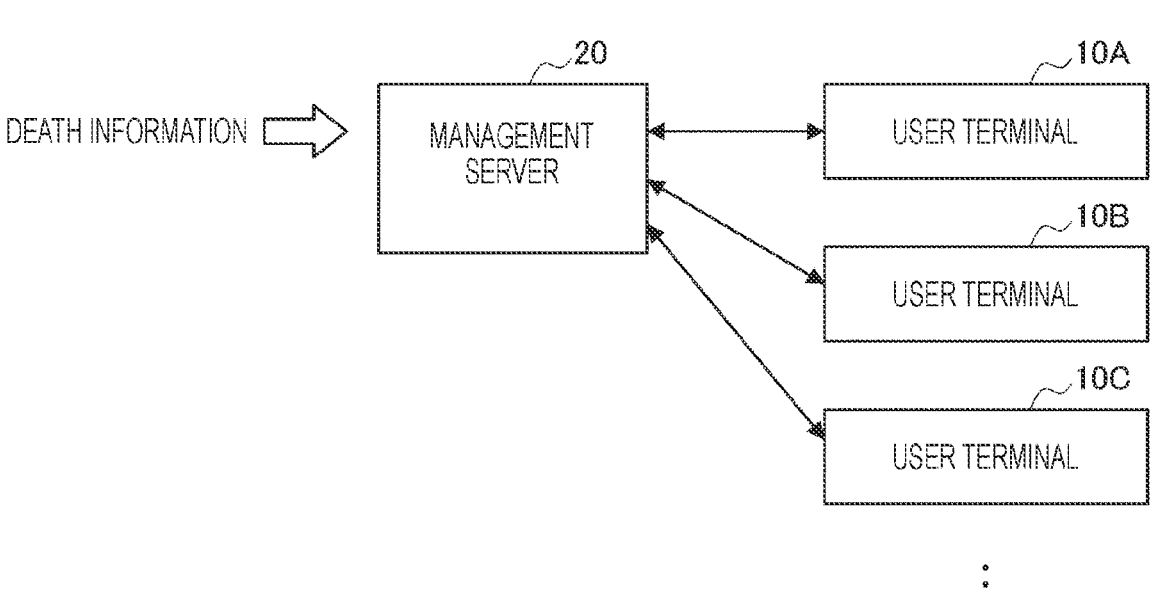
FIG. 1 is a diagram for explaining an overview or an information processing system according to an embodiment of the present disclosure.

Hereinafter, a preferred embodiment of the present disclosure will be described in detail with reference to the accompanying drawings. Note that in the present specification and drawings, components having substantially the same functional configuration are denoted using the same reference numerals. Redundant explanations are therefore omitted.

Furthermore, the description is given in the following order.

1. Overview of information processing system according to an embodiment of present disclosure
2. Configuration example of management server 20
3. Operation processing
4. Supplement 《1. Overview of Information Processing System According to Embodiment of Present Disclosure》

FIG. 1 is a diagram for explaining an overview of an information processing system according to an embodiment of the present disclosure. As illustrated in FIG. 1, the information processing system according to the present embodiment includes a management server 20 (an example of an information processing device) that manages information on a virtual object, and one or more user terminals 10 (10A, 10B, 10C . . . ) that use a virtual space.

The management server 20 has a function of executing various processes regarding the virtual object, such as a process of transferring a virtual object owned by the user to another person. In the present specification, various pieces of electronic data are assumed as virtual objects. For example, a virtual object may be image data generated in 2D or 3D, moving image data, audio data, electronic book, data, virtual currency, or the like. Furthermore, a virtual object may be various items, characters, decorations, currency, and the like that can be used in the virtual space. The virtual space is a space which is generated in 2D or 3D and in which a large number of users connected using user terminals via the internet can communicate with each other (exchange data). For example, the virtual space may be a space in which the users can share various experiences in real time through avatars. Examples of such a virtual space include a game, a live event, and an exhibition. Furthermore, the virtual space may be a so-called metaverse obtained by virtualizing (mirroring) the real world. The management server 20 may be a server that manages the virtual space (generates the virtual space or distributes information on the virtual space), and management of the virtual space may be performed by another server.

The user terminal 10 is an information processing terminal used by the user. For example, the user terminal 10 can be realized by a smartphone, a tablet terminal, a personal computer (PC), a head mounted display (HMD) mounted on the head, a projector, a television device, a game console, or the like. The HMD may have a non-transmissive display unit that covers the entire field of view, or may have a transmissive display unit. Examples of the HMD having a non-transmissive display unit include a glasses-type device having a so-called augmented reality (AR) display function of superimposing and displaying a virtual object in a real space. Furthermore, the HMD may be a device capable of arbitrarily switching the display unit between a non-transmissive type and a transmissive type. The user may view/listen a video from the user's viewpoint (viewpoint of the user's avatar) in the virtual space by using the user terminal 10. The video from the user's viewpoint in the virtual space is obtained from, for example, a server that distributes information on the virtual space. Furthermore, it is also possible to experience the virtual space by virtual reality (VR) using the non-transmissive HMD that covers the entire field of view as the user terminal 10. The display unit of the HMD includes a left-eye display and a right-eye display, and the user can stereoscopically view the video from the user's viewpoint in the virtual space.

(Review of Problems)

Here, as described above, in recent years, use of the virtual space has become widespread, and each user owns various virtual objects in the virtual world. However, there are cases where the virtual objects are left unattended and wasted due to various factors such as the owner's death or disappearance, lowering of mental capacity due to dementia, and no login to the virtual space for a long period of time. Furthermore, there is also a concern about an inheritance trouble of the virtual objects.

Therefore, in the information processing system according to the present disclosure, processing of a virtual object can be appropriately performed.

More specifically, information (referred to as a "processing tag" in the present specification) stipulating a processing method of a virtual object is set in advance for each virtual object, so that when a trigger for starting processing such as death of the user who is the owner is acquired, the management server 20 executes the stipulated processing according to the processing tag for the virtual object owned by the user. Note that, since it is difficult for the user to set the processing tags in advance for all the virtual objects, the management server 20 performs control to automatically judge the processing method for the virtual object for which the processing tag is not set.

An overview of the information processing system according to an embodiment of the present disclosure has been described above. Subsequently, the configuration of the management server 20 included in the information processing system according to the present embodiment will be described with reference to the drawings.

«2. Configuration Example of Management Server 20»

Figure 2:
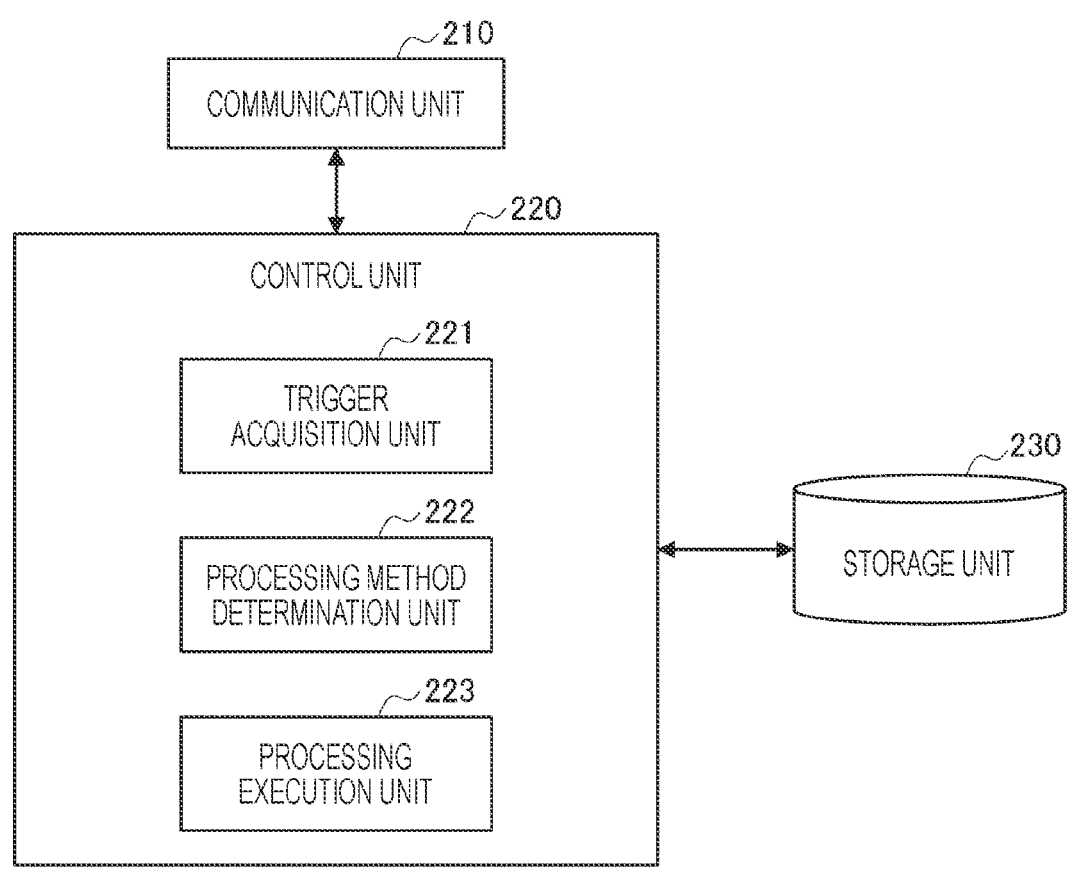
FIG. 2 is a block diagram illustrating an example of a configuration of a management server according to the present embodiment.

FIG. 2 is a block diagram illustrating an example of the configuration of the management server 20 according to the present embodiment. The management server 20 is a server that communicably connects to the user terminal 10 and an event management terminal 50 via a network. The management server 20 may be a cloud server including a plurality of servers.

Figure 3:
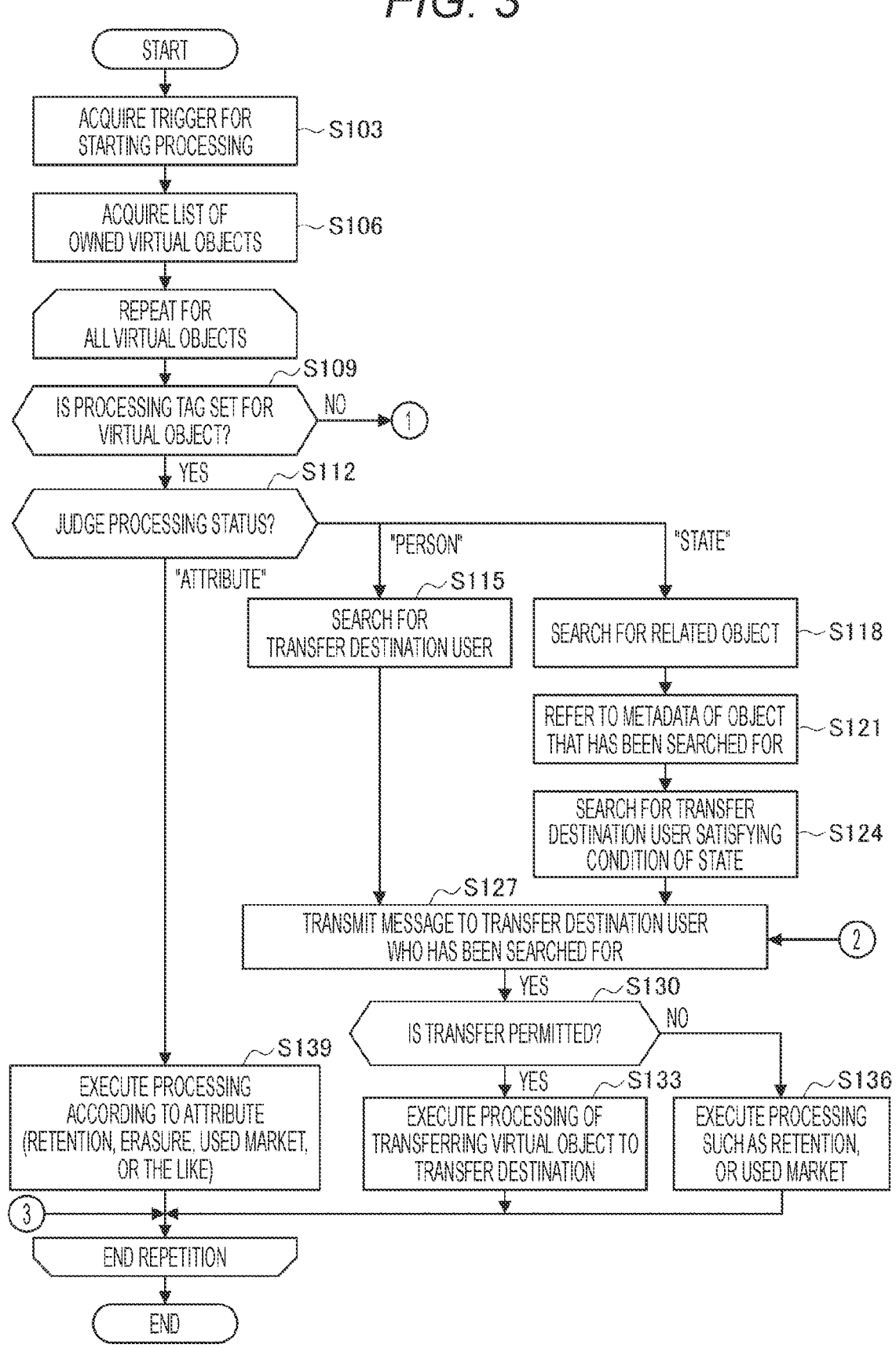
FIG. 3 is a flowchart illustrating an example of a flow of processing of a virtual object according to the present embodiment.

As illustrated in FIG. 3, the management server 20 includes a communication unit 210, a control unit 220, and a storage unit 230.

(Communication Unit 210)

The communication unit 210 transmits and receives data to and from an external device in a wired or wireless manner. The communication unit 210 is communicably connected to the user terminal 10, a server that manages the virtual space, and various servers (for example, a public office server, a hospital server, and a funeral home server) that transmit information serving as a processing start trigger by using, for example, a wired/wireless local area network (LAN), Wi-Fi (registered trademark), Bluetooth (registered trademark), a mobile communication network (Long Term Evolution (LTE), fourth generation mobile communication system (4G), and fifth generation mobile communication system (5G)), or the like.

(Control Unit 220)

The control unit 220 functions as an arithmetic processing device and a control device, and controls an overall operation in the management server 20 in accordance with various programs. The control unit 220 is realized by an electronic circuit such as a central processing unit (CPU) or a microprocessor, for example. Furthermore, the control unit 220 may include a read only memory (ROM) that stores programs, operation parameters, and the like to be used, and a random access memory (RAM) that temporarily stores parameters and the like that change appropriately.

Furthermore, the control unit 220 according to the present embodiment also functions as a trigger acquisition unit 221, a processing method determination unit 222, and a processing execution unit 223.

The trigger acquisition unit 221 acquires a processing trigger for starting processing of a virtual object from an external device via the communication unit 210. The processing trigger is, for example, information regarding death, disappearance (fictitious death due to confirmation of declaration of disappearance), reduction in mental capacity due to dementia or the like, a funeral, or the like of the user, and can be acquired from the public office server, the hospital server, or the funeral home server. For example, the trigger acquisition unit 221 may acquire update information on family register information from the public office server and acquire information regarding death or disappearance. Furthermore, the trigger acquisition unit 221 may acquire data of a death certificate from the hospital server or data of a funeral schedule from the funeral home server, and make a determination of death (acquire the processing trigger).

Furthermore, the processing trigger may be information indicating that the user has not logged in to the virtual space for a long period of time or the like, and acquired from a server that manages the virtual space. The long period of time can be appropriately set, for example, 2 years, 5 years, 10 years, 20 years, or the like. The user may be notified in advance (for example, as terms of use of the virtual space) that the owned virtual object is to be processed in a case where the user does not log in for the long period of time.

Furthermore, the processing trigger may be information requesting to start processing according to the intention of the user, such as a gift inter vivos, and is acquired from the user terminal 10, for example.

The processing method determination unit 222 determines the processing method of a virtual object owned by the user. Information regarding a virtual object owned by the user may be acquired from the management server of the virtual space or may be stored in the storage unit 230 in advance. The processing method determination unit 222 judges whether or not a processing tag is set for each virtual object owned by the user, and determines the processing method according to the processing tag in a case where the processing tag is set. For example, in a case where the status of the processing tag is "person", the processing method determination unit 222 searches for a predetermined person as a transfer destination user, and determines the processing method to be a processing method of transferring the virtual object to the other user who has been searched for. Furthermore, in a case where the status of the processing tag is "state", the processing method determination unit 222 searches for another user satisfying the condition of the state as a transfer destination user, and determines the processing method to be a processing method of transferring the virtual object to the other user who has been searched for. Furthermore, in a case where the transfer is not permitted by the transfer destination user who has been searched for, the processing method determination unit 222 determines the processing method to be a predetermined processing method other than transfer. Furthermore, in a case where the status of the processing tag is "attribute", the processing method determination unit 222 determines the processing method to be a processing method according to the attribute. Details will be described later with reference to FIG. 3.

Furthermore, in a case where a processing tag is not set, the processing method determination unit 222 appropriately determines the processing method according to a predetermined judgment criterion. Details will be described later with reference to FIG. 4.

The processing execution unit 223 executes processing of the virtual object by the processing method determined by the processing method determination unit 222. Examples of the processing method include transfer, retention, erasure, and special movement.

Transfer is to transfer the attribution of the virtual object to another user, and can be said to be normal movement in contrast to special movement. As transfer processing, for example, the processing execution unit 223 instructs the server that manages the virtual space to transfer the data of the virtual object to a virtual storage area (storage area for the virtual space) of the transfer destination user. Data may be moved within the server that manages the virtual space, may be moved to an external server, or may be moved to the user terminal 10. Furthermore, as the transfer processing, the processing execution unit 223 may rewrite the owner information of the virtual object to the transfer destination user for the server that manages the virtual space, for example.

Retention is not to move the data of the virtual object but to keep the current state. At this time, the owner information may be rewritten as "dead" or the like. Erasure means erasing data of the virtual object. Special movement is not movement (normal) to another user who is the transfer destination but movement to a specific server. For example, the virtual object is moved to a used market server that sells the virtual object, or moved to a sharing server that enables the virtual object to be freely used by anyone.

An example of the processing method has been described above, but the present embodiment is not limited thereto.

(Storage Unit 230)

The storage unit 230 is realized by a read only memory (ROM) that stores programs, operation parameters, and the like used for Processing of the control unit 220, and a random access memory (RAM) that temporarily stores parameters and the like that change appropriately. According to the present embodiment, the storage unit 230 stores information on the virtual space.

The configuration of the management server 20 has been described in detail, but the configuration of the management server 20 in the present disclosure is not limited to the example illustrated in FIG. 2. For example, the management server 20 may be realized by a plurality of devices. Furthermore, the management server 20 may function as one or the distribution systems of the virtual space.

«3. Operation Processing»

Next, a flow of processing of a virtual object according to the present embodiment will be specifically described with reference to the drawings. FIGS. 3 and 1 is a flowchart illustrating an example of the flow of processing of a virtual object according to the present embodiment.

First, as illustrated in FIG. 3, the trigger acquisition unit 221 of the management server 20 acquires a trigger for starting processing (step S103). The trigger for starting processing is, for example, death information or the user.

Next, the processing method determination unit 222 acquires a list of virtual objects owned by the user (step S106). The processing method determination unit 222 may call the list of virtual objects from the storage unit 230, or may request and acquire the list of virtual objects from the server that manages the virtual space. The list of virtual objects may include information regarding a virtual object. Information regarding a virtual object is, for example, a processing tag or reference information.

Then, the control unit 220 determines the processing method for each of all the virtual objects owned by the user. Specifically, first, the processing method determination unit 222 judges whether or not a processing tag is set for a virtual object (step S109).

Next, in a case where a processing tag has been set (step S109/Yes), the processing method determination unit 222 judges the status of the processing tag (step S112).

Next, in a case where the status of the processing tag is "person", the processing method determination unit 222 searches for the person defined by the processing tag as a transfer destination user (step S115). The user (owner) can set in advance an arbitrary person as a transfer destination of the virtual object. For example, the name or the like of the person is registered. The processing method determination unit 222 searches for the relevant person from among other users who use the virtual space. For example, information on the other users who use the virtual space may be acquired by inquiring the server that manages the virtual space.

Furthermore, in a case where the status of the processing tag is "state", the processing method determination unit 222 searches for the related object defined by the processing tag (step S118). The related object may be an object specified in the processing tag. The object may be a virtual object or a thing (real object) existing in the real space. The user (owner) can arbitrarily set the condition of the state for determining the transfer destination user in advance. "Condition of the state" includes, for example, the best relationship with the user, having met the user most recently, having given a present to the user, or the like. In these cases, the related object is the "user himself/herself". Furthermore, in a case where the "condition of the state" is, for example, a predetermined times of visits to the user's grave (grave in the virtual space or the real space), the related object is the "user's grave". Furthermore, in a case where the "condition of the state" is, for example, a visit to a user's favorite place (place in the virtual space or the real space), the related object is the "user's favorite place".

The processing method determination unit 222 searches for an object related to the state that has been set (step S118), refers to the metadata of the object that has been searched for (step 121), and searches for a transfer destination user satisfying the condition of the state (step S124). The metadata of the object may be acquired from various servers. Furthermore, the metadata of the object is an example of information related to the object, and includes various information regarding the object. For example, the processing method determination unit 222 can acquire "information on a person who has visited", "information on a person who has met", "information on time spent with another user", "information on a person who gave a present", and the like as the object metadata. Therefore, the processing method determination unit 222 specifies, for example, "the person who has been most friendly with the user (person who has stayed together for a long time)" defined as the state, and searches for the relevant person (another user who is the transfer destination) from the other users who use the virtual space. Furthermore, the processing method determination unit 222 can specify, for example, "a person who has visited the user's grave a predetermined number of times" defined as the state, and search for the relevant person (another user who is the transfer destination) from among the other users who use the virtual space.

Subsequently, the processing method determination unit 222 transmits a message (inquiry as to whether or not to receive transfer) to the transfer destination user who has been searched for, and obtains permission for transfer (steps S127 and S130).

Next, in a case where permission for transfer is obtained (step S130/Yes), the processing method is determined to be a processing method of transferring the virtual object to the transfer destination user, and the processing execution unit 223 executes processing of transferring the virtual object to the transfer destination (step S133). Specifically, for example, the processing execution unit 223 performs control to transfer the data of the virtual object to the virtual storage area (storage area for the virtual space) of the transfer destination user.

In contrast, in a case where permission for transfer has not been obtained (in a case where transfer is rejected by the transfer destination user, or in a case where there is no reply) (step S130/No), the processing method is determined to be another processing method such as retention, movement to the used market server, or erasure, and the processing execution unit 223 executes the determined processing method (step S136). Regarding the processing method to be performed in a case where permission for transfer is not obtained from the transfer destination user, the user may set the processing method in the processing tag in advance, or the processing execution unit 223 may determine the processing method to be a predetermined processing method (for example, retention or erasure). Furthermore, the processing execution unit 223 may move the data of the virtual object to the used market server in a case where selling the virtual object in the used market is requested by the intention of the transfer destination user although permission for transfer has not been obtained. The sales amount (virtual currency) may be granted to the transfer destination user or may be donated according to the intention of the transfer destination user.

Furthermore, in a case where the status of the processing tag is "attribute", the processing method determination unit 222 determines the processing method according to the attribute defined by the processing, tag, and processing is executed by the processing execution unit 223 (step 3139). The user (owner) can arbitrarily set the attribute ("retention", "erasure.", "used market", or the like) of the processing method of the virtual object in advance.

As described above, when the control unit 220 of the management server 20 acquires a trigger for starting processing such as death information of the user, the control unit 220 judges whether or not a processing tag is set for the virtual object, and in a case where a processing tag is set, determines the processing method on the basis of the processing tag and executes processing. Therefore, it is possible to lower the possibility that the virtual object is left unattended and wasted.

Next, control in a case where a processing tag is not set for a virtual object will be described with reference to FIG. 4. It is difficult for the user to set processing tags in advance for all the virtual objects, and it is also assumed that there is a virtual object for which a processing tag is not set. In the present embodiment, in a case where a processing tag is not set for a virtual object, the processing method is determined according to a predetermined judgment criterion.

In a case where a processing tag is not set for a virtual object (step S109/No) the processing method determination unit 222 judges whether or not the virtual object includes personal information of the user (owner) (step S143). The judgment can be made on the basis of information on the virtual object. Although the personal information is used as an example here, the personal information is an example, and confidential information that should not be known to others may be widely targeted (for example, information that is confidential or the like).

Next, in a case where the virtual object does not include personal information (step S143/No), the processing method determination unit 222 judges whether or not the virtual object is a purchase (step S146). The judgment can be made on the basis of information on the virtual object.

Next, in a case where the virtual object is not a purchase (step S146/No), the processing method determination unit 222 judges whether or not the virtual object is a product made by the owner himself/herself (step S149). The judgment can be made on the basis of information on the virtual object.

Next, in a case where the virtual object includes personal information (step S143/Yes), or in a case where the virtual object is neither a purchase nor a product made by the owner himself/herself (step S149/No), the processing method is determined to be a processing method other than transfer, for example, a processing method of retention or erasure due to information protection and copyright, and is executed by the processing execution unit 223 (step 155).

In contrast, in a case where the virtual object does not include personal information (step S143/No), and the virtual object is a purchase (step S146/Yes) or a product made by the owner himself/herself (step S149/Yes), the processing method determination unit 222 refers to the action history of the owner on the basis of reference information of the virtual object, and searches for the transfer destination user from among the other users who use the virtual space (step S152), Reference information of a virtual object is a description tag attached to the virtual object (information describing what the virtual object is), and one or more description tags are attached to one virtual object. Note that the description tag is an example of information related to a virtual object.

For example, in a case where a virtual object is merchandise sold at an event of an idol A in the virtual space and is virtual clothes that can be put on an avatar, description tags such as "decoration", "clothes", "event name", "idol A" and the like are attached to the virtual object. Then, the processing method determination unit 222 selects a description tag with high rarity, refers to the action history of the user (owner) on the basis of the description tag, and searches for a transfer destination user appropriate to the virtual object. Examples of the action history include the action history of the user avatar in the virtual space. Note that the "action history of the user" is not limited to the action history in the virtual space, and may be the action history of the user in the real space. The processing method determination unit 222 searches for the transfer destination user on the basis of the action history related the selected description tag in the action history of the user. For example, the processing method determination unit 222 selects "idol A" from the description tags of the virtual object, refers to the action history related to "idol A" in the action history of the user, specifies another associated user as the transfer destination user, and searches for the relevant person from among the other users who use the virtual space. More specifically, another user who has participated in a virtual live concert of the idol A together with the user, another user who has exchanged messages with the user about the idol A, or the like can be specified as the transfer destination user. Note that the method of specifying the transfer destination user appropriate to the virtual object described here is an example, and the present embodiment is not limited thereto.

Then, after the processing method determination unit 222 has searched for the transfer destination user described in step 3152, the processing method determination unit 222 performs processing of step S127 and subsequent steps in FIG. 3. That is, in a case where permission for transfer is obtained from the transfer destination user (steps S127, S130/Yes), the processing method determination unit 222 determines the processing method to be the processing method of transferring the virtual object to the transfer destination user, and the processing execution unit 223 executes processing of transferring the virtual object to the transfer destination (step S133). In contrast, in a case where permission for transfer has not been obtained (step S130/No), the processing method determination unit 222 determines the processing method to be another processing method such as retention, movement to the used market server, erasure, or the like, and the processing execution unit 223 executes the determined processing method (step S136).

Control in a case where a processing tag is not set for a virtual object has been described above. Therefore, even for a virtual object for which the user has not set a processing tag in advance, appropriate processing can be automatically executed in the management server 20, and it is possible to reduce the possibility that the virtual object is left unattended and wasted and inheritance troubles.

Figure 4:
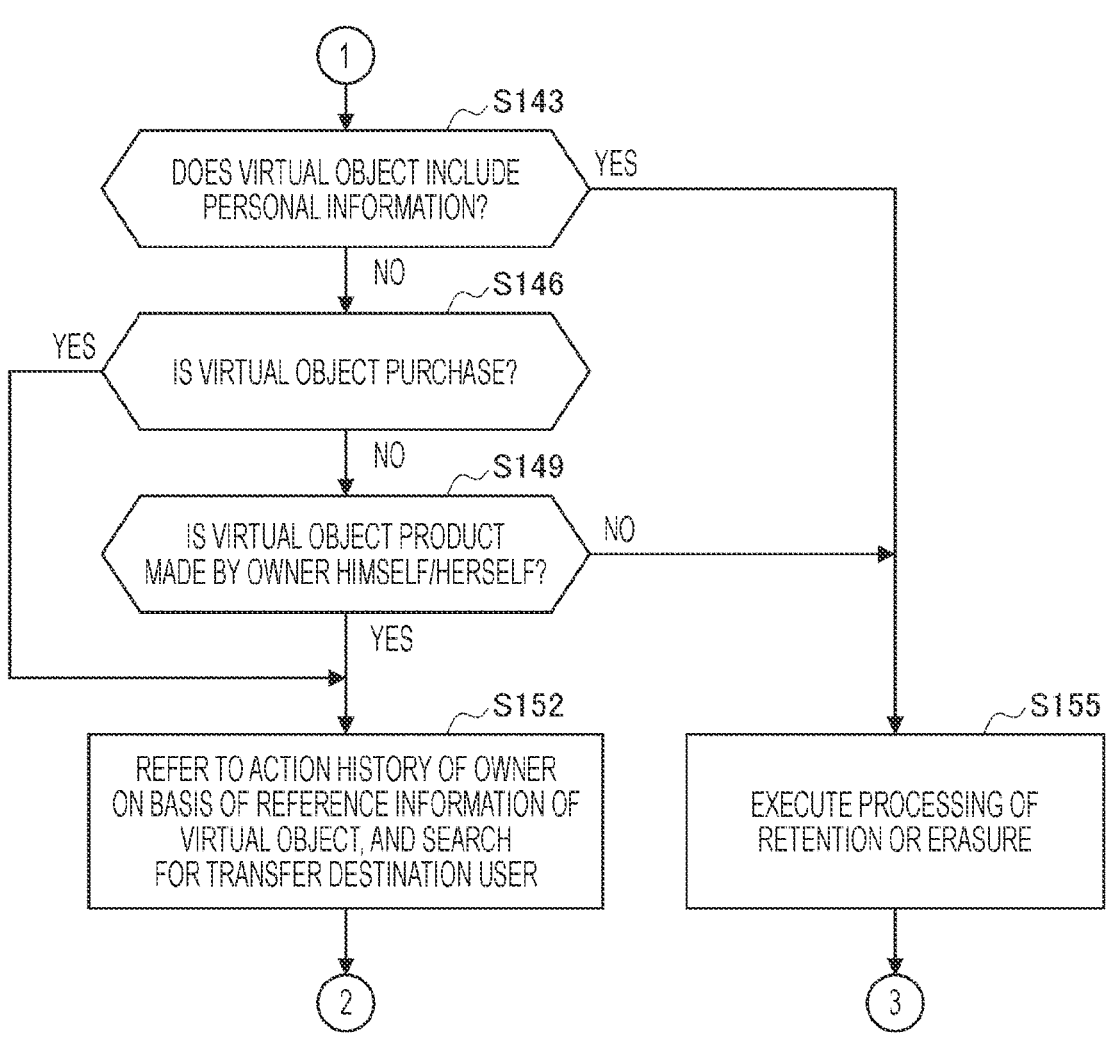
FIG. 4 is a flowchart illustrating the example of the flow or processing of the virtual object accordion to the present embodiment.

Note that, in the example illustrated in FIGS. 3 and 4, it has been described that processing is performed for all the virtual objects, but the present disclosure is not limited thereto, and for example, processing may be performed only on virtual objects in a range designated by the user. Furthermore, the operation processes illustrated in FIGS. 3 and 4 are merely examples, and some processes may be performed in different orders or in parallel.

«4 Supplement»

The preferred embodiment of the present disclosure has been described above in detail with reference to the accompanying drawings, but the present technology is not limited to such examples. It is obvious that those with ordinary skill in the technical field of the present disclosure may conceive various modifications or corrections within the scope of the technical idea recited in claims, and it is naturally understood that then also fall within the technical scope of the present disclosure.

For example, it is also possible to create one or more computer programs for causing hardware such as the CPU, the ROM, and the RAM built in the management server 20 described above to exhibit the functions of the management server 20. Furthermore, a computer-readable storage medium that stores the one or more computer programs is also provided.

Furthermore, the effects described in the present specification are merely exemplary or illustrative, and not restrictive. That is, the technology according to the present disclosure can exhibit other effects apparent to those skilled in the art from the description of the present specification, in addition to the effects described above or instead of the effects described above.

Note that the present technology can also have the following configuration.

(1)

An information processing device including a control unit that performs control for determining a processing method for each of one or more virtual objects owned by a user, according to presence or absence of information that is set for the each of the one or more virtual objects and that stipulates a processing method for a corresponding one of the one or more virtual objects when a processing trigger for starting processing of a virtual object is acquired.

(2)

The information processing device according to (1) in which in a case where the information is not set, the control unit performs processing of searching for another user to whom the corresponding one of the one or more virtual objects is to be transferred on the basis of description information attached to the corresponding one of the one or more virtual objects and describing the corresponding one of the one or more virtual objects.

(3)

The information processing device according to (2), in which the control unit searches for the another user to whom the corresponding of the one or more virtual objects is to be transferred on the basis of an action history related to the description information in an action history of the user in a virtual space or a real space.

(4)

The information processing device according to (3), in which the control unit searches for the another user to whom the corresponding one of the one or more virtual objects is to be transferred from among other users who use the virtual space.

(5)

The information processing device according to (4), in which in a case where permission for transfer is obtained from the another user who has been searched for, the control unit performs processing of transferring the corresponding one of the one or more virtual objects to the another user.

The information processing device according to (4), in which in a case where permission for transfer is not obtained from the another user who has been searched for, the control unit performs processing of any of retention of the corresponding one of the one or more virtual objects, erasure of the corresponding one of the one or more virtual objects, or movement of the corresponding one of the one or more virtual objects to a specific server.

(7)

The information processing device according to (1), in which in a case where the information is set, the control unit determines a processing method according to the information.

(8)

The information processing device according to (7), in which the processing method is any of transfer of the corresponding one of the one or more virtual objects, retention of the corresponding one of the one or more virtual objects, erasure of the corresponding one of the one or more virtual objects, or movement of the corresponding one of the one or more virtual objects to a specific server.

(9)

The information processing device according to (7) or (8), in which the control unit performs processing of searching for a person defined by the information from other users who use a virtual space.

(10)

The information processing device according to (9), in which the control unit performs processing of searching for a person satisfying a state defined by the information from the other users who use the virtual space.

(11)

The information processing device according to (10), in which the control unit specifies the person satisfying the state on the basis of information regarding an object related to the state in the virtual space or a real space.

(12)

The information processing device according to any one of (9) to (11), in which in a case where permission for transfer is obtained from the another user who has been searched for, the control unit performs processing of transferring the corresponding one of the one or more virtual objects to the another user.

(13)

The information processing device according to (12), in which in a case where permission for transfer is not obtained from the another user who has been searched for, the control unit performs processing or any of retention of the corresponding one of the one or more virtual objects, erasure of the corresponding one of the one or more virtual objects, or movement of the corresponding one of the one or more virtual objects to a specific server.

(14)

An information processing method including by a processor, performing control for determining a processing method for each of one or more virtual objects owned by a user, according to presence or absence of information that is set in the each of the one or more virtual objects and that stipulates a processing method for a corresponding one of the one or more virtual objects when a processing trigger for starting processing of a virtual object is acquired.

(15)

A program for causing a computer to function as a control unit that performs control for determining a processing method for each of one or more virtual objects owned by a user, according to presence or absence of information that is set for the each of the one or more virtual objects and that stipulates a processing method for a corresponding one of the one or more virtual objects when a processing trigger for starting processing or a virtual object is acquired.

REFERENCE SIGNS LIST

10 User terminal
20 Management server
210 Communication unit
220 Control unit
221 Trigger acquisition unit
222 Processing method determination unit
223 Processing execution unit
230 Storage unit

The invention claimed is:

1. An information processing device comprising:
circuitry configured to
    determine a processing method for each virtual object of one or more virtual objects owned by a user, according to presence or absence of information that is set for the each of the one or more virtual objects, and
    control performance of the determined processing method for each virtual object,
wherein the set information stipulates the processing method to be performed for each corresponding virtual object of the one or more virtual objects for which the information is set when a processing trigger for starting processing of a virtual object is acquired, and
wherein, for each respective virtual object of the one or more virtual objects for which the information is absent, the processing method to be performed is determined based on respective reference information of the respective virtual object.

2. The information processing device according to claim 1,
wherein in a case where the information is not set, the circuitry performs processing of searching for another user to whom the corresponding virtual object of the one or more virtual objects is to be transferred based description information attached to the corresponding virtual object of the one or more virtual objects and describing the corresponding virtual object of the one or more virtual objects.

3. The information processing device according to claim 2,
wherein the circuitry searches for the another user to whom the corresponding virtual object of the one or more virtual objects is to be transferred based on an action history related to the description information in an action history of the user in a virtual space or a real space.

4. The information processing device according to claim 3,
wherein the circuitry searches for the another user to whom the corresponding virtual object of the one or more virtual objects is to be transferred from among other users who use the virtual space.

5. The information processing device according to claim 4,
wherein in a case where permission for transfer is obtained from the another user who has been searched for, the circuitry performs processing of transferring the corresponding virtual object of the one or more virtual objects to the another user.

6. The information processing device according to claim 4,
wherein in a case where permission for transfer is not obtained from the another user who has been searched for, the circuitry performs processing of any of retention of the corresponding virtual object of the one or more virtual objects, erasure of the corresponding virtual object of the one or more virtual objects, or movement of the corresponding virtual object of the one or more virtual objects to a specific server.

7. The information processing device according to claim 1, wherein in a case where the information is set, the circuitry determines a processing method according to the information.

8. The information processing device according to claim 7, wherein the processing method includes at least one of transfer of the corresponding virtual object of the one or more virtual objects, retention of the corresponding virtual object of the one or more virtual objects, erasure of the corresponding virtual object of the one or more virtual objects, or movement of the corresponding virtual object of the one or more virtual objects to a specific server.

9. The information processing device according to claim 7, wherein the circuitry performs processing of searching for a person defined by the information from other users who use a virtual space.

10. The information processing device according to claim 9, wherein the circuitry performs processing of searching for a person satisfying a state defined by the information from the other users who use the virtual space.

11. The information processing device according to claim 10, wherein the circuitry specifies the person satisfying the state based on information regarding an object related to the state in the virtual space or a real space.

12. The information processing device according to claim 9, wherein in a case where permission for transfer is obtained from the another user who has been searched for, the circuitry performs processing of transferring the corresponding virtual object of the one or more virtual objects to the another user.

13. The information processing device according to claim 12, wherein in a case where permission for transfer is not obtained from the another user who has been searched for, the circuitry performs processing of any of retention of the corresponding virtual object of the one or more virtual objects, erasure of the corresponding virtual object of the one or more virtual objects, or movement of the corresponding virtual object of the one or more virtual objects to a specific server.

14. An information processing method, executed by at least one processor, the method comprising;

determining a processing method for each virtual object of one or more virtual objects owned by a user, according to presence or absence of information that is set for the each of the one or more virtual objects; and performing the determined processing method for each virtual object, wherein the set information stipulates the processing method to be performed for each corresponding virtual object of the one or more virtual objects for which the information is set when a processing trigger for starting processing of a virtual object is acquired, and wherein, for each respective virtual object of the one or more virtual objects for which the information is absent, the processing method to be performed is determined based on respective reference information of the respective virtual object.

15. A non-transitory computer-readable storage medium having embodied thereon a program, which when executed by a computer causes the computer to execute a method, the method comprising:

determining a processing method for each virtual object of one or more virtual objects owned by a user, according to presence or absence of information that is set for the each of the one or more virtual objects; and performing the determined processing method for each virtual object, wherein the set information stipulates a processing method to be performed for each corresponding virtual object of the one or more virtual objects for which the information is set when a processing trigger for starting processing of a virtual object is acquired, and wherein, for each respective virtual object of the one or more virtual objects for which the information is absent, the processing method to be performed is determined based on respective reference information of the respective virtual object.

* * * * *